United States Patent
Oh et al.

(10) Patent No.: US 9,208,028 B2
(45) Date of Patent: Dec. 8, 2015

(54) RECOVERY CODE MANAGEMENT METHOD AND MEMORY SYSTEM USING SAME

(71) Applicant: SAMSUNG ELECTRONICS CO., LTD., Suwon-Si, Gyeonggi-Do (KR)

(72) Inventors: Shin-Ho Oh, Suwon-Si (KR); Hee-Tai Oh, Goyang-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 202 days.

(21) Appl. No.: 13/935,600

(22) Filed: Jul. 5, 2013

(65) Prior Publication Data

US 2014/0075241 A1   Mar. 13, 2014

(30) Foreign Application Priority Data

Sep. 7, 2012   (KR) .................. 10-2012-0099514

(51) Int. Cl.
*G06F 11/00* (2006.01)
*G06F 11/14* (2006.01)
*G06F 11/07* (2006.01)

(52) U.S. Cl.
CPC ........ *G06F 11/1412* (2013.01); *G06F 11/0727* (2013.01); *G06F 11/141* (2013.01); *G06F 11/1402* (2013.01)

(58) Field of Classification Search
CPC .............. G06F 11/1412; G06F 11/141; G06F 11/0727; G06F 11/1004; G06F 11/1008; G06F 11/1402; G06F 11/3034; G06F 11/3037
USPC .................. 714/6.1, 6.11, 6.24, 42, 48, 54, 15
See application file for complete search history.

(56) References Cited

U.S. PATENT DOCUMENTS 7,177,989 B1 *  2/2007 McGinnis ..................... 711/151
7,406,649 B2    7/2008 Shimizume et al.
7,954,037 B2    5/2011 Lasser et al.
(Continued)

FOREIGN PATENT DOCUMENTS

JP  2006092542 A   4/2006
JP  2009512112 A   3/2009
JP  2009515281 A   4/2009
(Continued)

*Primary Examiner* — Joseph D Manoskey
(74) *Attorney, Agent, or Firm* — Volentine & Whitt, PLLC

(57) ABSTRACT

A method managing execution of recovery code in a memory system includes; upon detecting a read error using a CPU and firmware to execute recovery code defining a read recovery operation including a read retry operation, during execution of the recovery code, generating a read request directed to the read retry operation, and immediately thereafter terminating execution of the recovery code, and thereafter, only upon receiving an asynchronous interrupt from the memory controller following completion of the read retry operation, the CPU resumes execution of the recovery code by the firmware, otherwise the CPU performs another task unrelated to execution of the recovery code.

17 Claims, 10 Drawing Sheets

(56) References Cited

U.S. PATENT DOCUMENTS

| | | |
|---|---|---|
| 7,975,178 B2 | 7/2011 | Kim et al. |
| 8,122,329 B2 | 2/2012 | Kong et al. |
| 2006/0107122 A1 | 5/2006 | Kasahara |
| 2009/0327656 A1 | 12/2009 | Baum et al. |
| 2010/0277979 A1 | 11/2010 | Kang et al. |
| 2011/0041039 A1* | 2/2011 | Harari et al. .......... 714/773 |
| 2011/0066899 A1* | 3/2011 | Kang et al. ............ 714/54 |
| 2011/0307762 A1 | 12/2011 | Tiziani et al. |
| 2012/0084490 A1 | 4/2012 | Choi et al. |
| 2012/0087183 A1 | 4/2012 | Chang |

FOREIGN PATENT DOCUMENTS

| | | |
|---|---|---|
| JP | 2012505458 A | 3/2012 |
| KR | 100575657 B1 | 5/2006 |
| KR | 1020060048089 A | 5/2006 |
| KR | 1020090030078 A | 3/2009 |
| KR | 1020090119745 | 11/2009 |
| KR | 1020120037732 A | 4/2012 |

* cited by examiner

BLKi of MRAM

RECOVERY CODE MANAGEMENT METHOD AND MEMORY SYSTEM USING SAME

CROSS-REFERENCE TO RELATED APPLICATIONS

A claim for priority under 35 U.S.C. §119 is made to Korean Patent Application No. 10-2012-0099514 filed Sep. 7, 2012, the subject matter of which is hereby incorporated by reference.

BACKGROUND

The inventive concept relates to memory systems and methods of operating memory systems. More particularly, the inventive concept relates to recovery code management methods capable of minimizing or significantly reducing the time required by a CPU or processor to execute a recovery code process.

Contemporary memory systems include a storage device, such as one or more flash memory devices capable of nonvolatile data storage. It is understood that execution of a read operation directed to data stored in the storage device may result in read error(s). Read errors may be caused by many different factors.

Upon detecting a read error, a memory system may execute so-called "recovery code" that is intended to correct (or "recover" from) the read error. Hereafter, the broad class of methods and processes that use one or more recovery codes, as well as execution of the recovery code will be termed a "read recovery operation." A read recovery operation may be executed as part of, or independent from an error correction capability (ECC) provided by the memory system. The read recovery operation may be executed using firmware controlled by a Central Processing Unit (CPU) and/or processor of the memory system.

It is further understood, the storage devices like conventional NAND flash memory may use a variable "read voltage" to determine the "state" of stored data during a read operation. Most read recovery operations include an iteratively applied read operation (or "read retry operation") that is executed with a variable read voltage. That is, a sequence of read retry operations, each using a different read voltage, may be applied during a read recovery operation until a read error is corrected. Thus, a read error may be corrected using a read retry operation including a read retry operation, and/or a general ECC capabilities of the memory system.

SUMMARY

One embodiment of the inventive concept provides a method managing execution of recovery code defining a read recovery operation including a read retry operation for a memory system. The memory system includes a Central Processing Unit (CPU), firmware configured to execute the recovery code, a storage device and a memory controller that controls the storage device. The method includes; upon detecting a read error, the CPU causes the firmware to execute recovery code, during execution of the recovery code by the CPU and firmware, generating a read request directed to a read retry operation, and immediately thereafter terminating execution of the recovery code by the CPU and firmware, and while the memory controller and the storage device operate to execute the read retry operation, the CPU performs another task unrelated to executing the recovery code.

Another embodiment of the inventive concept provides a memory system including; a nonvolatile storage device and a memory controller that controls operation of the nonvolatile storage device, firmware stored at least in part in a volatile memory and including code defining a read recovery operation, wherein the read recovery operation includes an iteratively executed read retry operation, a Central Processing Unit (CPU) configured to operate in conjunction with the firmware to execute the recovery code in response to a read error, wherein during execution of the recovery code by the CPU and firmware, the firmware generates a read request associated with the read retry operation, and the CPU is further configured to immediately terminate execution of the recovery code upon generation of the read request, and while the memory controller and the storage device operate to execute the read retry operation, the CPU is further configured to perform another task unrelated to execution of the recovery code.

Another embodiment of the inventive concept provides a method managing execution of recovery code defining a read recovery operation including a read retry operation for a memory system. The memory system includes a Central Processing Unit (CPU), firmware configured to execute the recovery code, a storage device and a memory controller that controls the storage device. The method includes; upon detecting a read error, the CPU causes the firmware to execute recovery code, during execution of the recovery code by the CPU and firmware, generating a read request directed to a read retry operation, and immediately thereafter terminating execution of the recovery code by the CPU and firmware; and thereafter, only upon receiving an asynchronous interrupt from the memory controller following completion of the read retry operation, the CPU resumes execution of the recovery code by the firmware, otherwise the CPU performs another task unrelated to execution of the recovery code.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
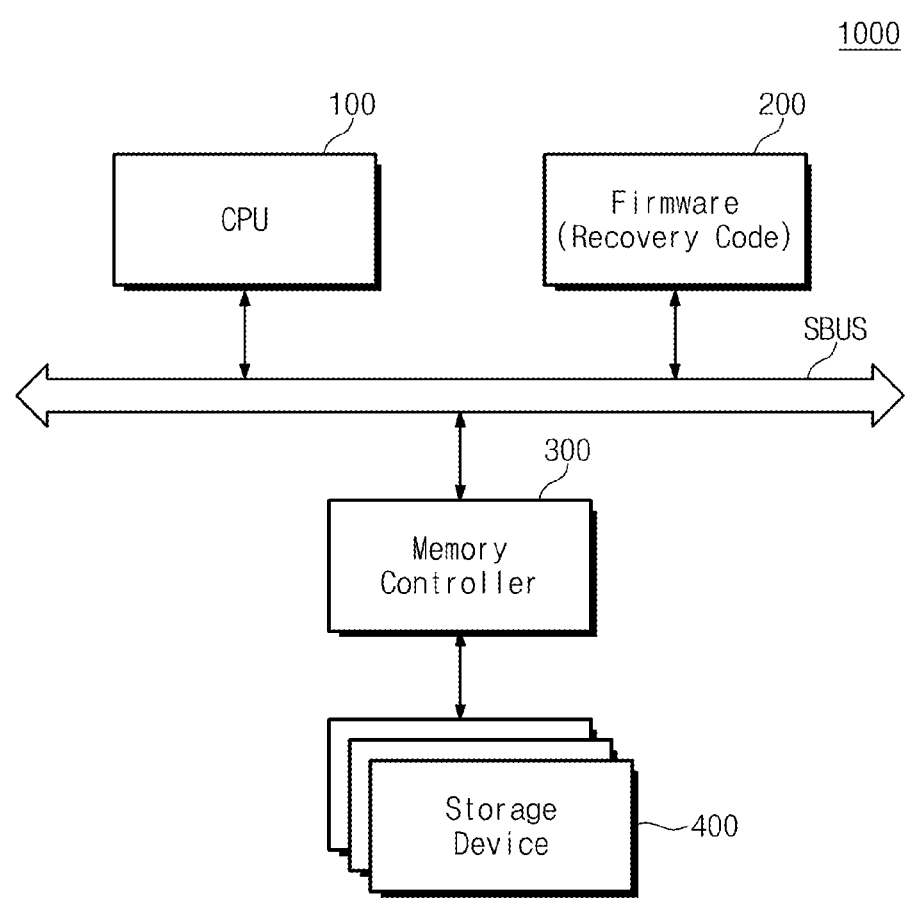
FIG. 1 is a block diagram illustrating a memory system according to an embodiment of the inventive concept.

Embodiments of the inventive concept will now be described in some additional detail with reference to the accompanying drawings. The inventive concept, however, may be embodied in various different forms, and should not be construed as being limited to only the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Embodiments disclosed hereafter may include complementary embodiments. Certain well understood details relate to data access operation(s) as well as the internal circuitry and related functionality associated with semiconductor data storage devices including (e.g.,) NAND flash memory and a DRAM will be omitted to avoid unnecessary and potentially distracting detail.

FIG. 1 is a block diagram illustrating a memory system 1000 according to an embodiment of the inventive concept that includes a CPU 100, firmware 200, a memory controller 300, and one or more storage device(s) 400.

As will be appreciated by those skilled in the art, the firmware 200 may include software (e.g., recovery code) implementing one or more read recovery operations, as well as other routine that may be executed by the CPU 100. In certain embodiments of the inventive concept, the firmware 200 may be stored or loaded in a memory (e.g., a SRAM) and may include recovery code implementing one or more read recovery operation(s) that may be used to correct a read error.

The one or more storage device(s) 400 may be implemented using flash memory or some other form of nonvolatile memory, such as a Magnetic Read Only Memory (MRAM). Hereafter, as a working example it is assumed that the one or more storage devices(s) 400 is a NAND flash storage 400 or "NAND storage 400".

The memory controller 300 may be used to "access" data (e.g., via read, write and/or erase operations) in relation to the one or more storage device(s) 400. Hereafter, as a working example it is assumed that the memory controller 300 is a NAND flash memory controller 300 or "NAND controller 300".

The CPU 100, the memory storing firmware 200, and the memory controller 300 are mutually connected via a system bus SBUS.

Upon initiation of a read request is generated by a previous "call to" recovery code stored with the firmware 200 during a read retry operation, the CPU 100 may immediately terminate execution of the recovery code. By doing this, the CPU 100 will be free to execute some other task. In other words, the CPU 100 need not sit idle (i.e., waiting) during the complete execution of recovery code until such time as a particular (unknown before-hand) number of read retry operation(s) results in the desired read error correction. Thus, the CPU 100 may perform other task(s) following initiation of each iterative read request until such time as a corresponding "interrupt" indicates completion of the read operation executed in response to said read request.

Then, in response to each interrupt, the CPU 100 will recall the recovery code from the firmware 200 and begin the process all over again (i.e., generating a "next" read request directed to a "next" read retry operation to be executed by the memory controller 300 in response to the next read request).

Figure 2:
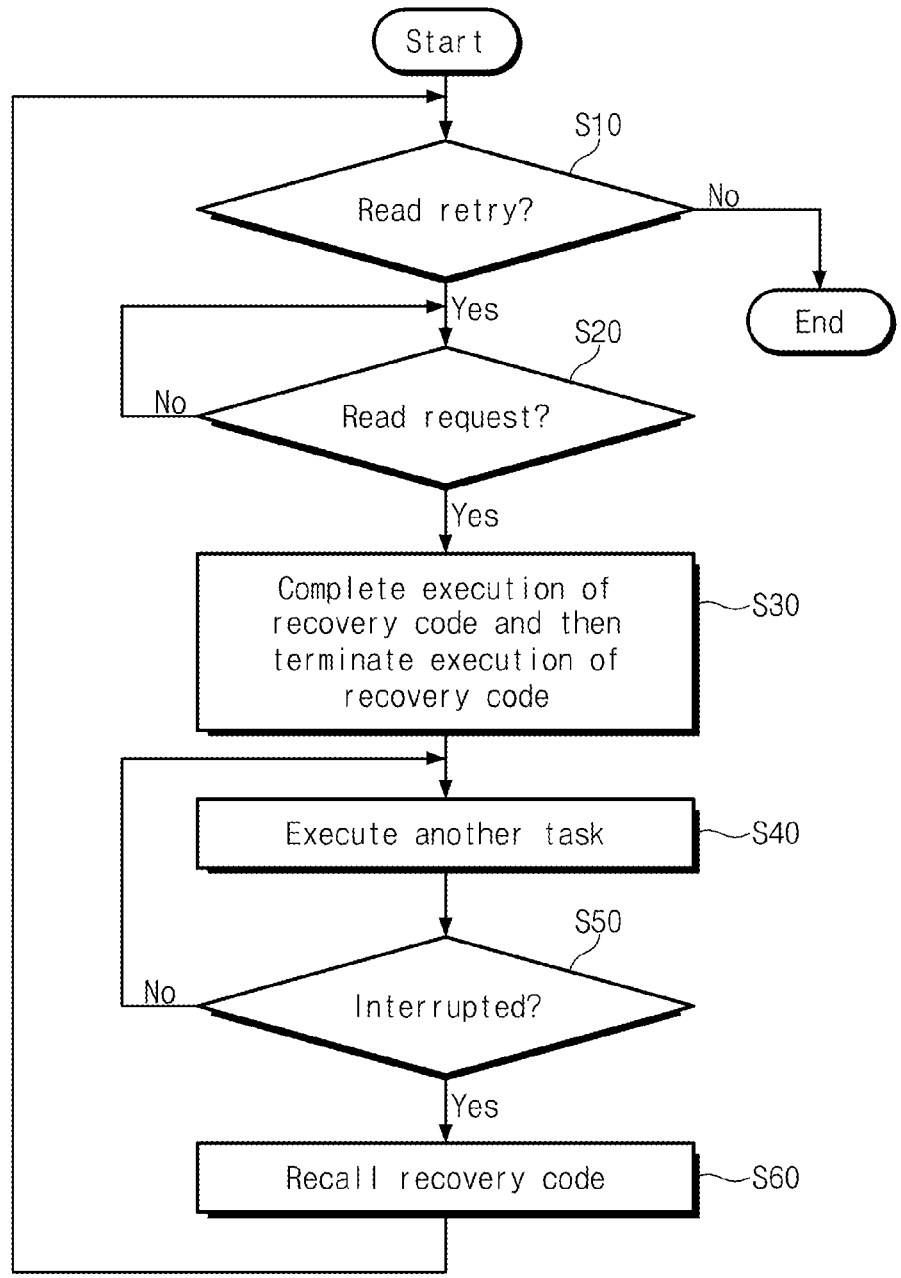
FIG. 2 is a flowchart summarizing a read recovery operation management method that may be executed by the memory system of FIG. 1 according an embodiment of the inventive concept.
Figure 3:
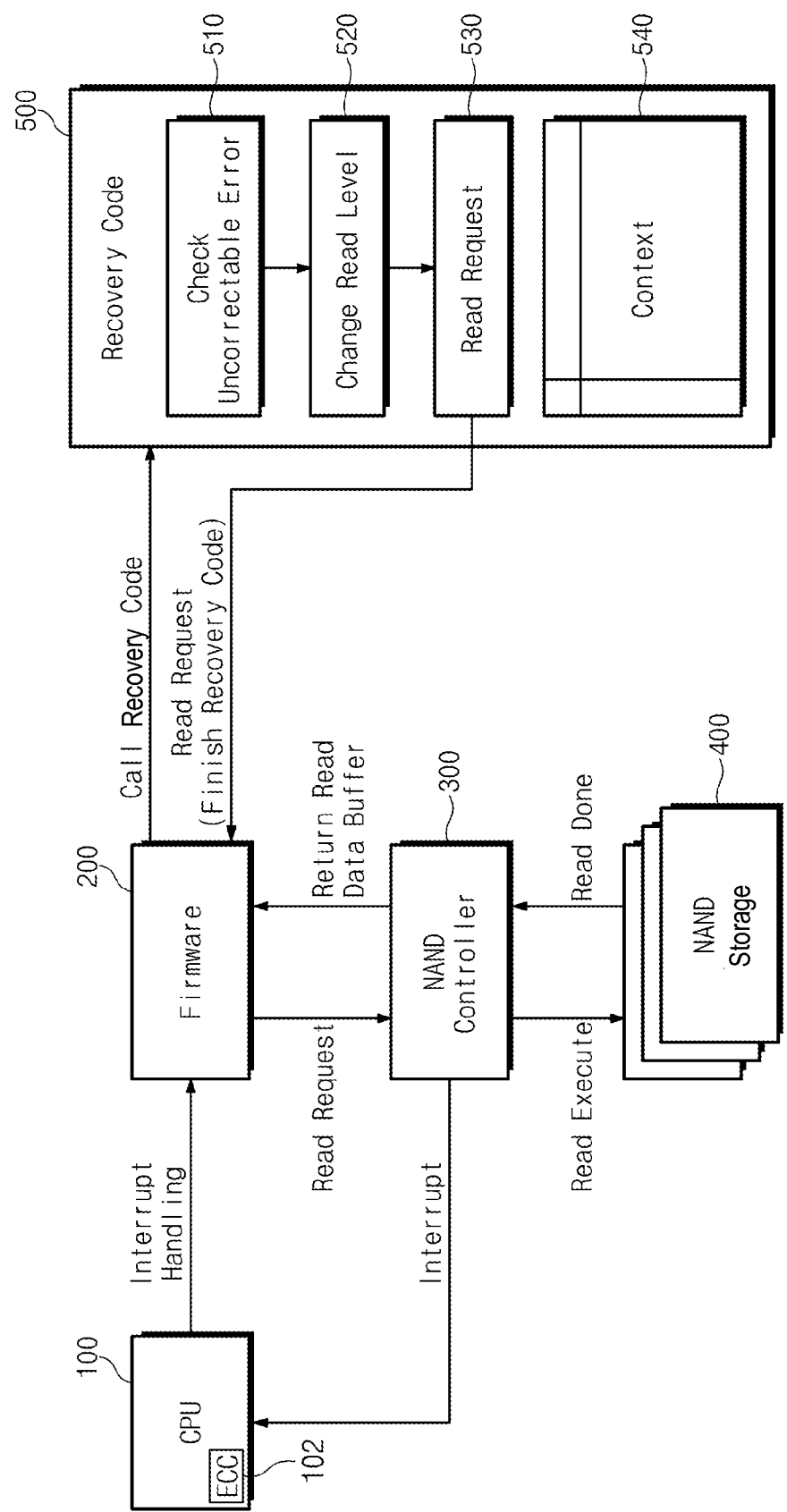
FIG. 3 is a block diagram further illustrating an operating sequence for the read recovery operation management method of FIG. 2.

FIG. 2 is a flowchart summarizing one management method for a read recovery operation that may be executed using the memory system of FIG. 1 according to embodiments of the inventive concept. FIG. 3 is a block diagram further illustrating an operating sequence for the read recovery operation management method of FIG. 2.

Referring collectively to FIGS. 1, 2 and 3, NAND storage 400 performs a read operation (or a read retry operation) in response to a read execute command received from the NAND controller 300. Upon completion of a read operation, a read done signal indicating completion of the read operation is communicated from the NAND storage 400 back to the NAND controller 300. The NAND controller 300 then provides an interrupt signal to the CPU 100 in response to the read done signal. The CPU 100 may then perform an interrupt handling procedure using (e.g.,) an asynchronous interrupt handling mode in response to the interrupt signal.

As a result of interrupt handling by the CPU 1, the firmware 200 may receive one or several possible commands from the CPU 100. For example, the firmware 200 may receive read data provided by the NAND controller 300 via a data buffer (note shown). Alternately or additionally, the firmware 200 may "call" (i.e., invoke or cause to run) recovery code 500 stored as part of or in conjunction with the firmware 200.

In the illustrated example of FIG. 3, it is assumed that the recovery code 500 used to functionally implement a read recovery operation is of a type that may be driven directly by the firmware 200 without necessarily involving the CPU 100. Thus, the recovery code of FIG. 3 may include, as functional block examples, a check uncorrectable read error bock 510, a change read voltage level block 520, a read request initiation block 530, and/or a context block storing a management state information for the recovery code 540. Here, the term "management state information" is used to denote data and/or routines that define the conditions and operating parameters of the data recovery operation implemented by the recovery code. Hence, the recovery code management state information may be used to appropriately manage the recovery code and the operation(s) (e.g., the read recovery operation) is defines.

In this context, when a read error is detected by the memory system 1000, the recovery code 500 may be invoked to determine (check) whether the read error is a correctable or an uncorrectable read error in view of the ECC capabilities provided by within the memory system 1000. (See, ECC 102 of FIG. 3 illustrating an embodiment of the inventive concept wherein the ECC is implemented using the CPU 100). Thus, if a read error is correctable, it may be left to the ECC capabilities for correction. Instead, if the read error is determined to be uncorrectable by the ECC capabilities, the recovery code 500 may be used to invoke a read recovery operation. As noted above, certain read recovery operations includes multiple read retry operations. Each read retry operation may involve initiating a read request, changing the level of one or more reference voltages (e.g., a read voltage), reading target memory cells, providing resulting read data, etc. Thus, in this operating context, the recovery code 500 may run in conjunction with the firmware 200 to ultimately generate a read request (or a next read request) and provide it to the NAND controller 300.

In terms CPU 100 computational capabilities, the invocation and execution of recovery code 500, in whole or in part, takes a relatively long time. For example, the time between a point when a read request signal is applied to the NAND controller 300 and a point when read data is retrieved from the NAND storage 400 is a very long time as measured by CPU cycles. As a result, where management and execution of recovery code is performed using a conventional synchronous scheme, a great deal of CPU 100 processing time is lost.

In contrast, embodiments of the inventive concept do not waste this large number of CPU cycles, but instead manage the execution of recovery code implementing a read recovery operation asynchronously. In certain embodiments of the inventive concept, upon application of a read request signal as the result of recovery code being executed (at least in part) using firmware 200 to implement a read recovery operation (or a constituent read retry operation), the CPU 100 will immediately terminate (or suspend) execution of the recovery code in order to free the CPU to other tasks. In other words, the CPU 100 will end execution of recovery code without waiting until data is read from the NAND storage 400 in order to execute "another task" (i.e., a task unrelated to the read retry operation being executed by the NAND controller 300 and the NAND storage device 400.

Then, while the another task is being performed by the CPU 100—following suspension of the recovery code execution—the NAND controller 300 will generate and provide the read execution command to the NAND storage 400 in response to the read request. And then, the NAND storage 400 will retrieve and provide read data specified by the read execute signal and/or read request controlling the current read operation (or read retry operation).

And then, once the read operation (or read retry operation) is completed, a read done signal is sent from the NAND storage 400 to the NAND controller 300.

And then, upon receiving the read done signal, the NAND controller 300 will determine whether the current read operation (or read retry operation) is complete. And then, upon determining that the current read operation (or read retry operation) is complete, the NAND controller 300 will communicate an interrupt to the CPU 100.

In response to the interrupt, the CPU 100 will initiate interrupt handling using an asynchronous scheme, and the firmware 200 may then issue another call to the recovery code 500.

By terminating the execution of the recovery code 500 by the CPU 100 while the read operation (or read retry operation) is being executed, a recovery code recall (or resumption) operation will be included as part of each iteratively executed read operation or read retry operation. However, the CPU 100 will not be forced to wait idly during execution of each read retry operation, but may be used to execute another task.

In the context of the memory systems described by FIGS. 1 and 3, a flowchart summarizing a method of managing execution of the recovery code is further described with reference to FIG. 2.

First, a determination is made as to whether a (first) read retry operation should be executed (S10). For example, the recovery code 500 of FIG. 3 may be used to check whether an uncorrectable read error has been detected, and upon so determining (S10=Yes) a first read retry operation may be called. It is assumed in certain embodiments of the inventive concept that the calling of the read retry operation using the recovery code 500 involves both the firmware 200 and the CPU 100.

Then, a next determination is made as to whether a read request associated with the first read retry operation has been generated (S20) by the firmware 200. Once the read request has been generated by the firmware 200 (S20=Yes), the CPU 100 will complete execution of any remaining routines called for by the recovery code together with the firmware 200 (S30). However, upon completion of any remaining recovery code routines, the CPU 100 immediately terminates execution of the recovery code in conjunction with the firmware 200 to thereby release the CPU 100 in order to execute another task (S40).

As noted above, the term "another task" is used in this context to denote any task (e.g., a next queued task waiting for the CPU, or sequence of waiting tasks) other than execution of a next read retry operation as designated by the recovery code 500 in conjunction with the firmware 200.

This "another task" continues to occupy the CPU 100 until an interrupt is asynchronously applied to the CPU 100 as described above following completion of the first read retry operation. (S50=Yes). This approach improves operating efficiency for the CPU 100.

When an interrupt indicating completion of the first read retry operation is generated (S50=Yes), the recovery code is recalled by the firmware 200 to correct the target read error in the read data obtained by the first read retry operation, or a second (next) read retry operation will be called (S10), if the read error remains uncorrectable.

Management state information associated with the recovery code may be stored in the context area 540 upon execution of one or more read operations (or read retry operations). That is, management state information for the recovery code may be stored at the context area 540 for each operation executed in accordance with the recovery code.

Figure 4:
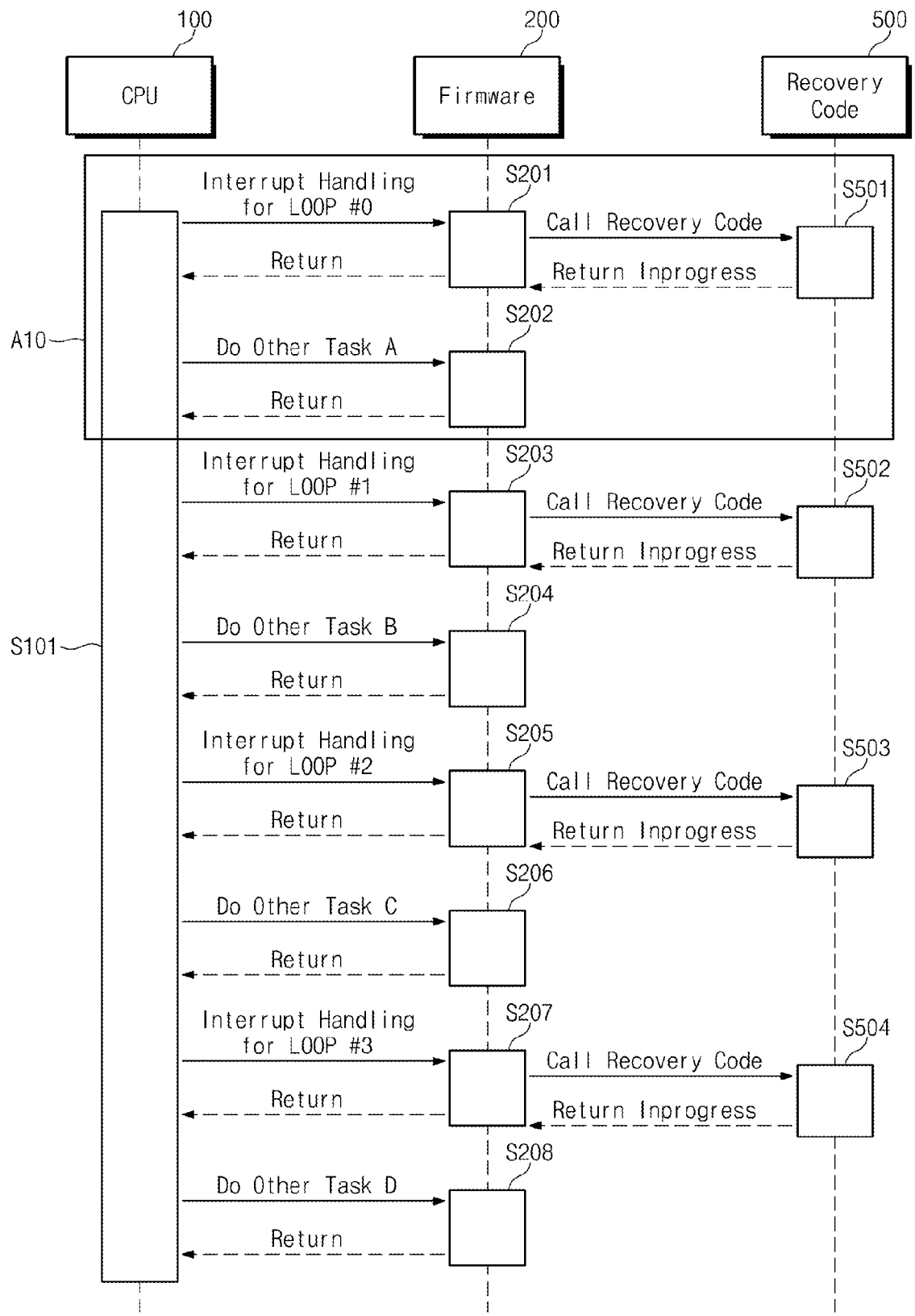
FIG. 4 is a conceptual diagram illustrating one possible asynchronous protocol that may be used to execute the read recovery operation management method of FIG. 3.

FIG. 4 illustrates one possible asynchronous interrupt protocol that may be used to manage execution of recovery code according to the certain embodiments of the inventive concept like those described in relation to FIGS. 1, 2 and 3.

As shown at a reference mark S201, firmware 200 may call the recovery code 500 during interrupt handling by the CPU 100. The recovery code 500 may return inprogress as shown at a reference mark S501. A read request may be generated at the return operation. The firmware 200 may apply a return message to the CPU 100 in response to the read request. At this time, the recovery code 500 may be immediately terminated, and the CPU 100 may command another task A of the firmware 200. As shown at a reference mark S202, the firmware 200 may perform the task A or transfer a return message to the CPU 100 after execution. The above-described protocol A10 may be understood a program execution loop #0.

A next program execution loop #1 may be performed using the same protocol A10. Also, subsequent program executions loops #2 and #3 may be performed using the same protocol A10.

As a result, if a read request is generated, the recovery code 500 may be immediately terminated in each program execution loop. If an interrupt is generated upon completion of a read operation, the recovery code 500 may be recalled.

Figure 5:
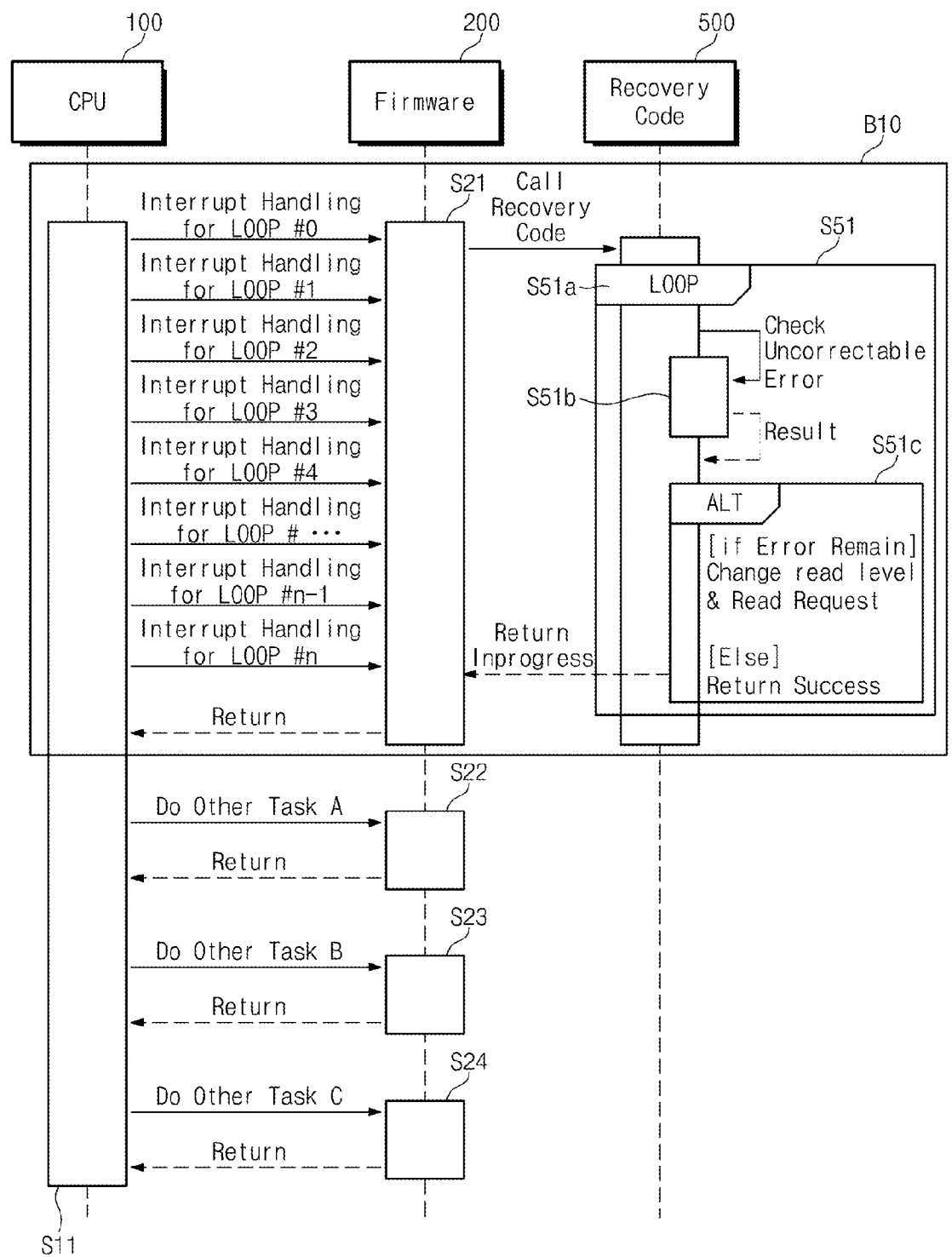
FIG. 5 is a conceptual diagram illustrating one possible synchronous protocol that may be used to execute the read recovery operation management method of FIG. 3.

By way of comparison, FIG. 5 illustrates a conventional "synchronous" protocol that might be used to manage the execution of recovery code.

Referring to FIG. 5, a CPU 100 may be occupied by a recovery code 500 until a protocol B10 is ended. That is, the CPU 100 may not perform another until the protocol B10 is ended. As a result, the CPU 100 may wait until a read operation according to a read request is completed. Also, once the recovery code 500 is called, it may occupy the CPU 100 completely until all program loops are ended. Reference marks S51a, S51b, and S51c in a protocol B10 may indicate processes of the above-described read retry operation.

Figure 6:
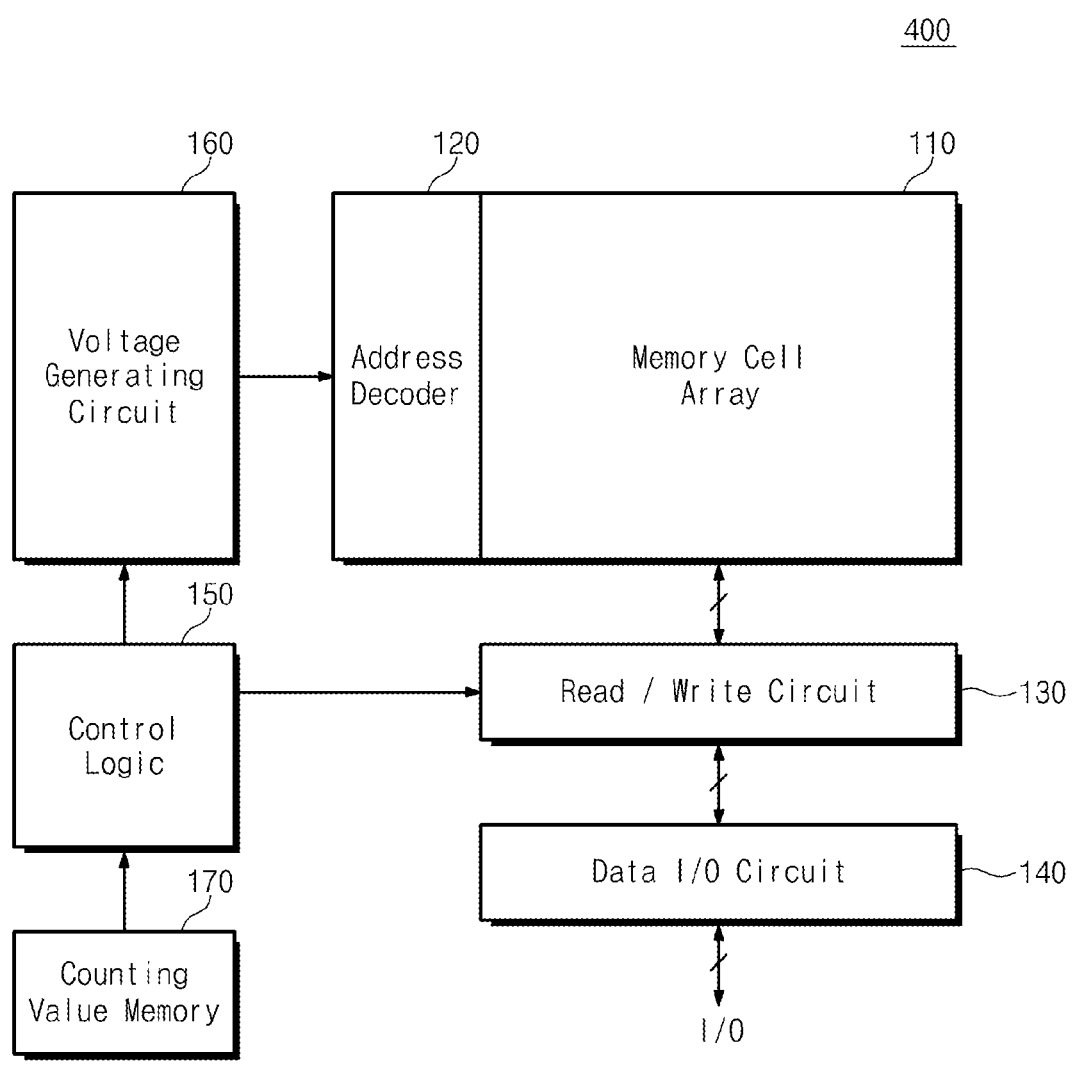
FIG. 6 is a block diagram further illustrating the storage device 400 of FIG. 1.

FIG. 6 is a block diagram further illustrating the data storage device 400 of FIG. 1 in accordance with certain embodiments of the inventive concept.

Referring to FIG. 6, the storage device 400 comprises a memory cell array 110, an address decoder 120, a read/write circuit 130, a data input/output circuit 140, control logic 150, a voltage generating circuit 160, and a counting value memory 170.

In the case of an MRAM memory cell array, the memory cell array 110 may include memory cells arranged in a plurality of rows (or, word lines) and a plurality of columns (or, bit lines). Also, in case of a flash memory cell array, the memory cell array 110 may be formed of NAND memory blocks.

The memory cell array 110 may include a main area for storing general data and a spare area for storing additional information (e.g., flag information, ECC, a device code, a maker code, page information, etc.) associated with the main area and general data.

In the case of a NAND flash memory, a program or read operation may be performed by the page, and an erase operation on programmed data may be performed by the block being a unit where a plurality of pages is included. Information associated with a program operation on each page or erase operation may be stored at memory cells of the spare area (or, a part of the main area). The main and spare areas may not be limited to a specific format. For example, the main and spare areas may be disposed on the memory cell array 110 in various formats. Also, the number of bits stored at each of memory cells in the main and spare areas may be decided variously, not limited to a specific value.

Each memory block in the memory cell array 110 may be divided into a plurality of memory areas. Each of the divided memory areas may correspond to one or more word lines (or, one or more pages).

The read/write circuit 130 may be controlled by the control logic 150, and may operate as a sense amplifier or a write driver according to a mode of operation.

During a write (or program) operation, the read/write circuit 130 may operate as a write driver which drives selected bit lines to store data at a selected memory block. For this, the read/write circuit 130 may be formed of a plurality of pages buffers (not shown) corresponding to columns (or, bit lines) or column pairs (or, bit line pairs), respectively.

During a read operation, the read/write circuit 130 may operate as a sense amplifier which read data from the memory cell array 110. The read operation performed by the read/write circuit 130 may be applied to both the main area and the spare area, not limited to the main area. Thus, the read/write circuit 130 may perform all operations of reading normal data and additional data such as indication information for managing wear-leveling. Normal data read by the read/write circuit 130 may be output to an external device (e.g., a memory controller or a host) through a buffer. An erase/program counting value read by the read/write circuit 130 may be provided to the control logic 150.

The control logic 150 may control a read operation according to a control of a memory controller 200. That is, the control logic 150 may read data from a plurality of memory areas MA.

The control logic 150 may control the address decoder 120, the voltage generating circuit 160, and the read/write circuit 130 according to a read manner.

The voltage generating circuit 160 may generate word line voltages (e.g., a program voltage, a read voltage, a pass voltage, etc.) to be supplied to word lines and a voltage to be supplied to a bulk (e.g., a well area) where memory cells are formed, according to a mode of operation. A voltage generating operation of the voltage generating circuit 160 may be performed under the control of the control logic 150.

Under the control of the control logic 150, the address decoder 120 may select one of memory blocks (or, sectors) in the memory cell array 110 and select at least one of word lines (a memory area) in the selected memory block.

The counting value memory 170 may be connected with the control logic 150 to store a counting value associated with the indication information. Herein, the counting value associated with the indication information may be an erase counting value on the memory block. Also, the counting value associated with the indication information may be a power-on or power-off counting value on the memory block. The counting values may be stored in a cumulative type or in a 0 or 1 bit value type according to even-numbered counting and odd-numbered counting.

Herein, the counting value memory 170 may exist at a predetermined area of each memory block when it stores an erase counting value. Meanwhile, the counting value memory 170 may exist at a specific area of the memory cell array 110 when it stores a power-on/off value.

The control logic 150 may control the read/write circuit 130 such that data is read by the page at a read operation. Also, the control logic 150 may control such that a memory block is uniformly accessed according to a counting value stored at the counting value memory 170.

The memory cell array 110 of FIG. 6 may include NAND flash memory cells.

The nonvolatile semiconductor memory device may be a mask read-only memory (MROM), a programmable read-only memory (PROM), an erasable programmable read-only memory (EPROM), an electrically erasable programmable read-only memory (EEPROM), or the like.

In non-volatile memories, however, MROM, PROM, and EPROM are not free to be erased and written to by a system itself, so that it is not easy for general users to update stored contents. On the other hand, EEPROM is capable of being electrically erased or written. Application of the EEPROM is widened to an auxiliary memory or to system programming where continuous updates are needed (flash EEPROM). In particular, the degree of integration of a flash EEPROM may be higher than that of a conventional EEPROM. For this reason, the flash EEPROM may be advantageous for application to a large-volume auxiliary storage device. A NAND flash EEPROM (hereinafter, referred to as a NAND flash memory) of flash EEPROMs may have such an advantage that the degree of integration of the NAND flash EEPROM is higher than that of another flash EEPROM.

The flash memory may be programmed or erased iteratively. However, a program-erase cycle of each block may be limited within a predetermined number. In the event that a block is worn out, the performance of a partial area of the flash memory may be remarkably lowered or the loss of use may be caused. In this case, a user of a flash memory system may experience the loss of data stored at a block worn out or suffer bad influence due to impossibility of a data storage capacity.

Wear of a block (or, a physical location) in the flash memory system may be decided mainly by an erase cycle, and the flash memory may be worn out after erase operations of about 105. Thus, erase cycles of memory blocks (or, physical locations) may be leveled over an entire area of the flash memory to make lifetime of the flash memory longer.

Figure 7:
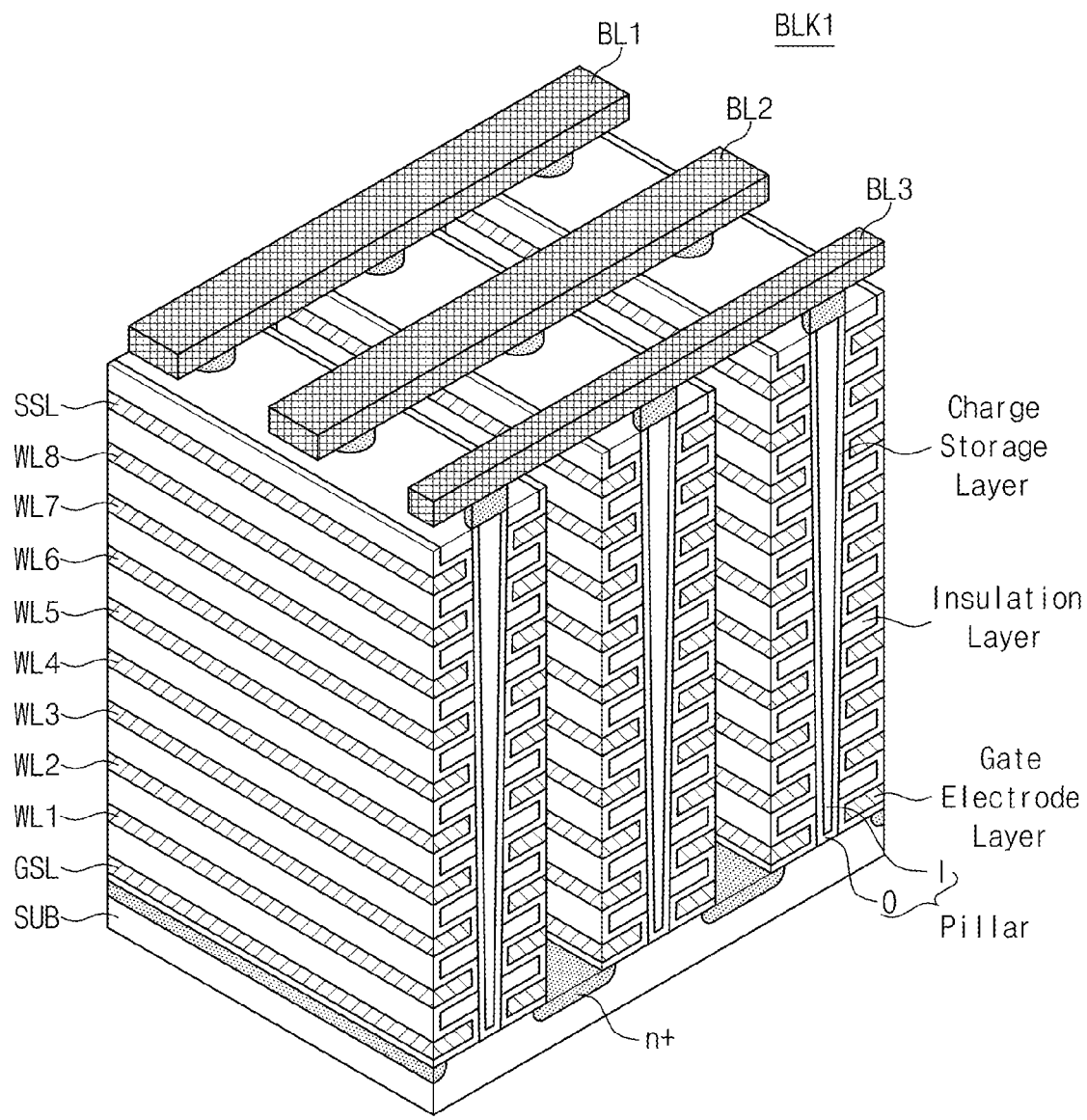
FIG. 7 is a perspective view illustrating one possible three-dimensional (3D) structure for a NAND flash memory block that may be used in the memory cell array 110 of FIG. 6 in certain embodiments of the inventive concept.

FIG. 7 is a perspective view illustrating a three-dimensional (3D) structure of a NAND flash memory block in a memory cell array 110 of FIG. 6.

Referring to FIG. 7, a memory block BLK1 may be formed in a direction perpendicular to a substrate SUB. An n+ doping region may be formed at the substrate SUB. A gate electrode layer and an insulation layer may be alternately deposited on the substrate SUB. A charge storage layer may be formed between the gate electrode layer and the insulation layer.

A V-shaped pillar may be formed by vertically patterning the gate electrode layer and the insulation layer in a vertical direction. The pillar may be connected with the substrate SUB through the gate electrode layer and the insulation layer. An outer portion O of the pillar may be formed of channel semiconductor, and an inner portion I thereof may be formed of an insulation material such as silicon oxide.

The gate electrode layers of the memory block BLK1 may be connected with a ground selection line GSL, a plurality of word lines, WL1 to WL8, and a string selection line SSL. The pillars of the memory blocks BLK1 may be connected with a plurality of bit lines BL1 to BL3, respectively. In FIG. 7, there is illustrated an example in which the memory block BLK1 includes two selection lines SSL and GSL, eight word lines WL1 to WL8, and three bit lines BL1 to BL3. However, the inventive concept is not limited thereto.

Figure 8:
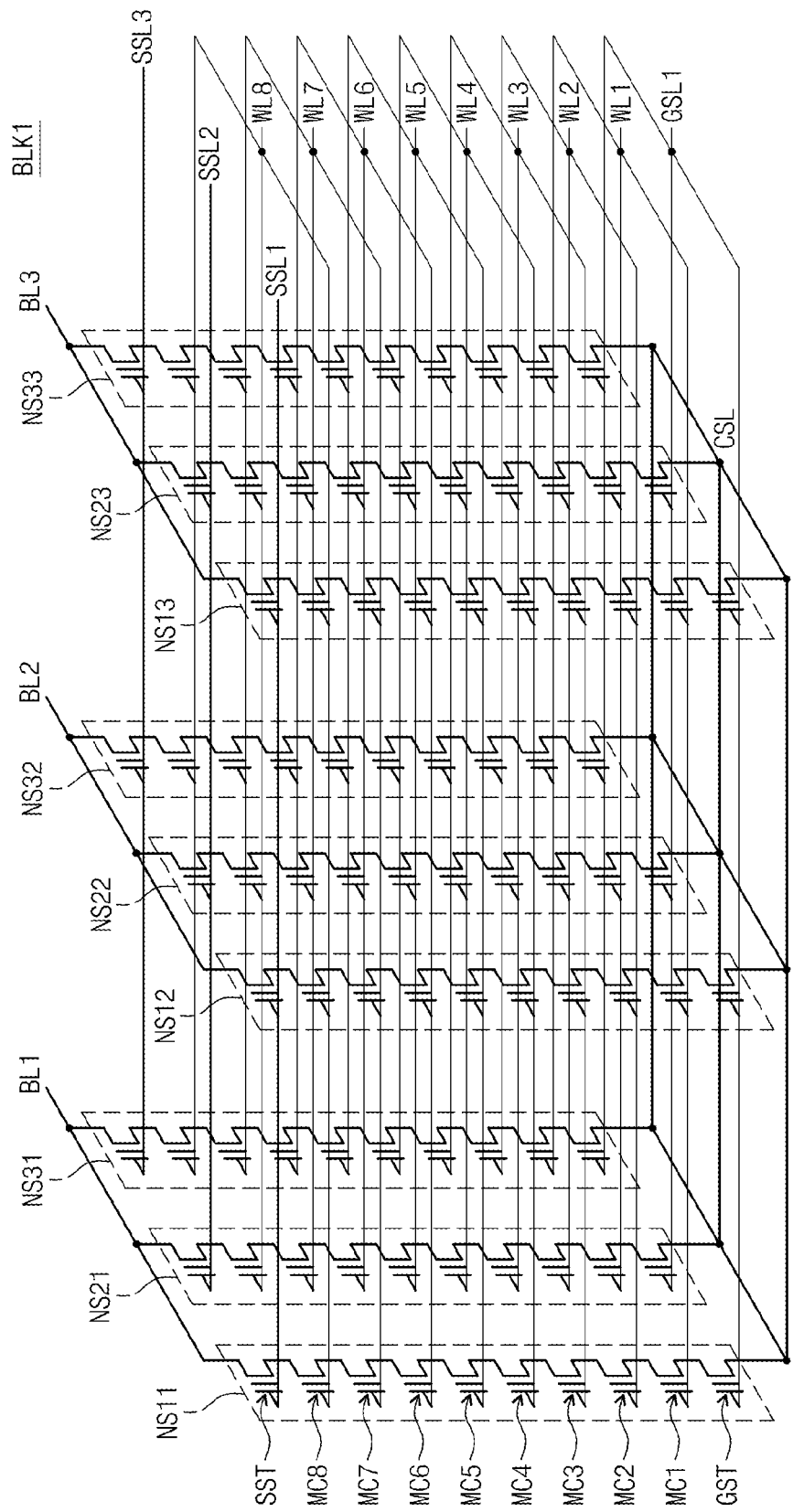
FIG. 8 is a partial equivalent circuit diagram for the memory block of FIG. 7.

FIG. 8 is a partial equivalent circuit diagram of the memory block BLK1 of FIG. 7. Referring to FIG. 8, NAND strings NS11 to NS33 may be connected between bit lines BL1 and BL3 and a common source line CSL. Each NAND string (e.g., NS11) may include a string selection transistor SST, a plurality of memory cells MC1 to MC8, and a ground selection transistor GST.

In each NAND string, the string selection transistor SST may be connected with a string selection line SSL1, SSL2, or SSL3. The memory cells MC1 to MC8 may be connected with corresponding word lines WL1 to WL8, respectively. The ground selection transistor GST may be connected with a ground selection line GSL1. The string selection transistor SST may be connected with a bit line BL, and the ground selection transistor GST may be connected with the common source line CSL.

Word lines at the same height (e.g., WL1) may be connected in common. The ground selection lines GSL1 may be connected in common A first word line WL1 and the selection lines GSL1 and SSL1 may be selected to program memory cells connected with the first word line WL1 and belonging to the NAND strings NS11, NS12, and NS13.

As described with reference to FIGS. 7 and 8, in the event that the memory block BLK1 has a three-dimensional structure, control logic 150 may control a read operation on memory cells in a corresponding memory block.

Figure 9:
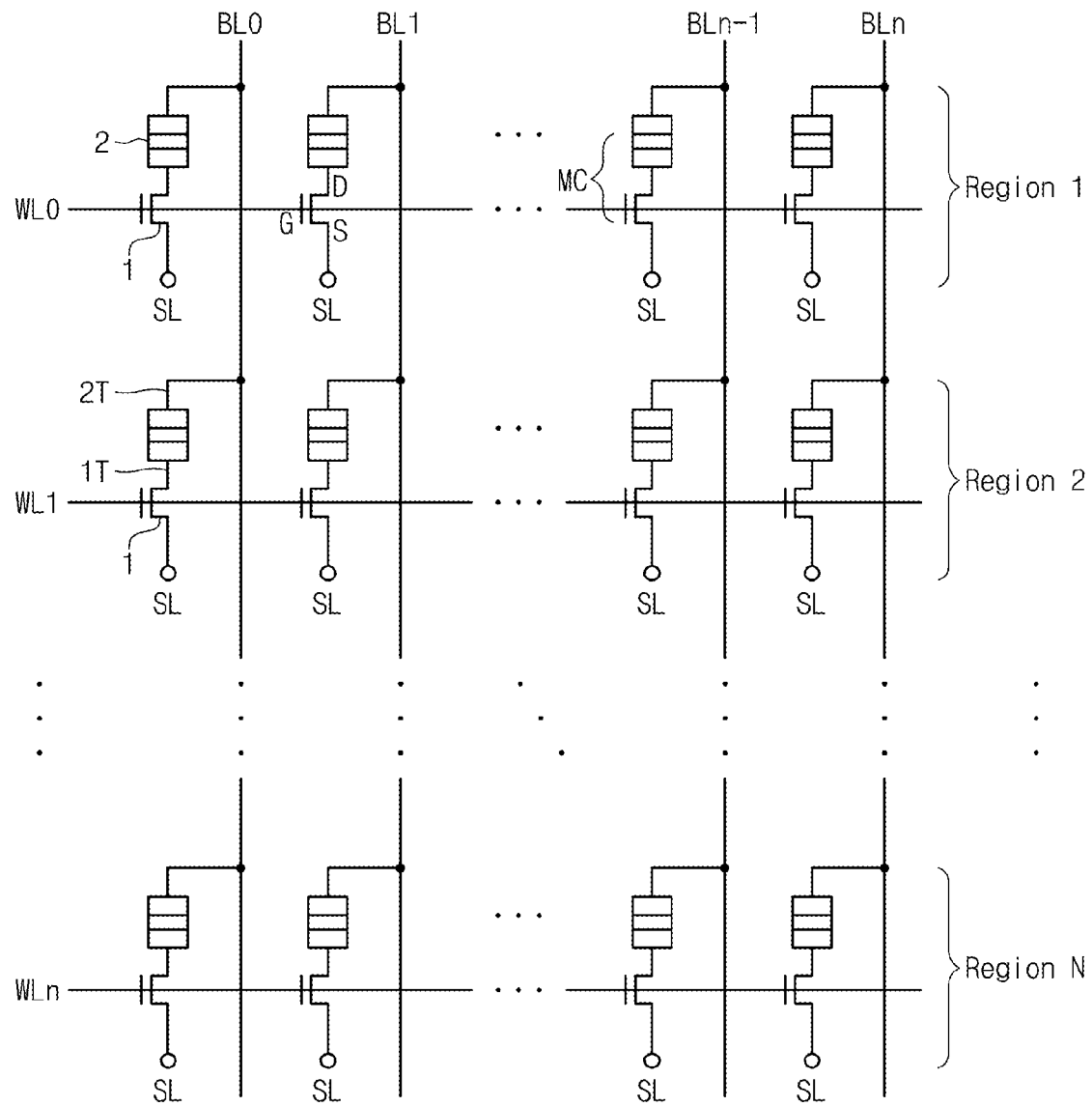
FIG. 9 is a partial circuit diagram illustrating a magnetic memory block that may be incorporated within the memory cell array 110 of FIG. 6 in certain embodiments of the inventive concept.

FIG. 9 is a partial circuit diagram illustrating a magnetic memory block of the memory cell array 110 of FIG. 6.

Referring to FIG. 9, a memory block in an MRAM may be divided into a plurality of memory regions.

In FIG. 9, cell transistors 1 may be arranged two-dimensionally along a row direction and a column direction. The cell transistor 1 may have a gate G, a source S, and a drain D. The cell transistor 1 may be a MOSFET formed at a semiconductor substrate.

Word lines WL0 to WLn may be arranged along a row direction to be connected with the gates G of the cell transistors 1, and bit lines BL0 to BLn may be arranged along a column direction to be connected with the drains D of the cell transistors 1.

A magnetic tunnel junction (MTJ) 2 may be disposed between a bit line BLi and the cell transistor 1. The MTJ 2 may be used as an element for storing information in the MRAM.

The cell transistor 1 and the MTJ 2 may form a unit cell MC of the MRAM.

Unit cells MC of the MRAM according to the inventive concept may be arranged not only two-dimensionally but also three-dimensionally. That is, a plane including memory cells of the MRAM may be in plurality. Further, the MRAM according to the inventive concept may be applied to both an embodiment including a semiconductor substrate where transistors are formed and an embodiment not including a semiconductor substrate. That is, the unit cell MC may not include the cell transistor 1. In this case, the MRAM may be connected with a function circuit formed of transistors. This connection may be made by a method using wire bonding, flip-chip bonding, solder bumps, and so on used at a chip package.

A first terminal 1T formed between the MTJ 2 and the cell transistor 1 may be an anti-ferromagnetic layer selected from a group of IrMn, PtMn, MnO, MnS, MnTe, MnF2, FeF2, FeCl2, FeO, CoCl2, CoO, NiCl2, NiO, Cr or a ferromagnetic layer selected from a group of Fe, Co, Ni, Gd, Dy, MnAs, MnBi, MnSb, CrO2, MnOFe2O3, FeOFe2O3, NiOFe2O3, CuOFe2O3, MgOFe2O3, EuO, and Y3Fe5O12.

Also, a second terminal 2T formed between the MTJ 2 and the bit line BL may be a ferromagnetic layer selected from a group of Fe, Co, Ni, Gd, Dy, MnAs, MnBi, MnSb, CrO2, MnOFe2O3, FeOFe2O3, NiOFe2O3, CuOFe2O3, MgOFe2O3, EuO, and Y3Fe5O12.

An insulation film such as an aluminum oxide film may be disposed between the first terminal 1T and the second terminal 2T. The insulation film may be formed to be in contact with the ferromagnetic layers of the first and second terminals 1T and 2T. As an information storage element, the MTJ 2 may have a rectangular shape where width and height lengths are different from each other.

The MRAM (Magnetic RAM or Magnetoresistive RAM) having a memory cell structure of FIG. 9 may be nonvolatile, free from a reuse number, suitable for high integration, fast in an operating speed, and operable at a low voltage.

The MRAM may have a magnetic tunnel junction formed of a pinning layer, a pinned layer, an insulation layer, and a free layer. At this time, a resistance value of the MTJ may be decided according to magnetization directions of the free layer and the pinned layer. As a result, data writing may be performed as an operation to decide the magnetization direction.

The MTJ may be used as a structure for storing information in the MRAM using a resistance characteristic dependent on the magnetization direction.

An operation of reading information stored at a specific cell of the MRAM may be accomplished by measuring a resistance value of the MTJ and comparing the measured resistance value with a reference resistance value. Herein, an external reference scheme or a self-reference scheme may be used according to a method of selecting the reference resistance value. The external reference scheme may use a resistance value of a predetermined resistance device as the reference resistance value, and the self-reference scheme may use a self-resistance value as the reference resistance value.

As described with reference to FIG. 9, one memory block may be divided into a plurality of memory regions. In this case, word lines may be sequentially selected in an ascending or descending order according to indication information to reduce or minimize a wear-leveling difference at writing.

The inventive concept may be described using a flash memory and an MRAM as nonvolatile memory devices. However, the inventive concept is not limited thereto.

The nonvolatile memory device may be used as data storage, and may be EEPROM (Electrically Erasable Programmable Read-Only Memory), STT-MRAM (Spin-Transfer Torque MRAM), CBRAM (Conductive bridging RAM), FeRAM (Ferroelectric RAM), PRAM (Phase change RAM) called OUM (Ovonic Unified Memory), RRAM or ReRAM (Resistive RAM), nanotube RRAM, PoRAM (Polymer RAM), NFGM (Nano Floating Gate Memory), holographic memory, molecular electronics memory device), or insulator resistance change memory.

Figure 10:
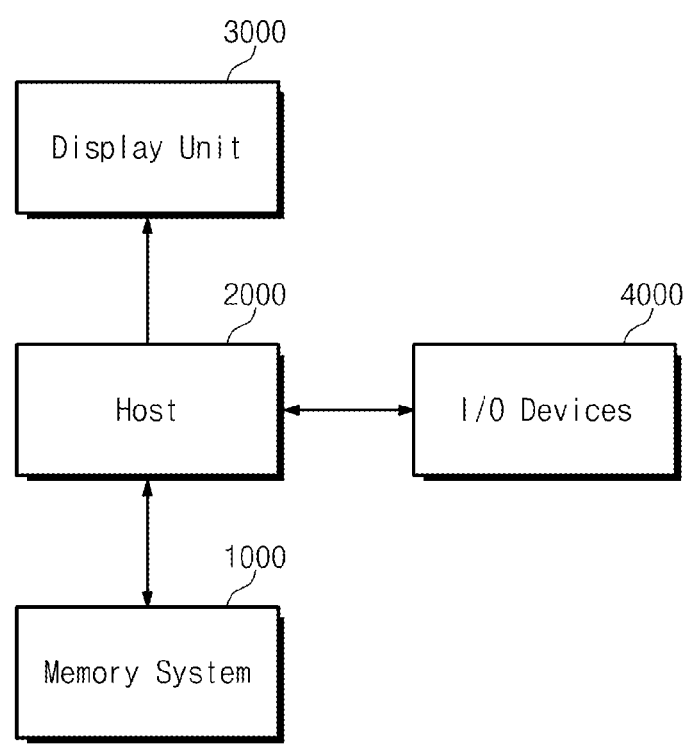
FIG. 10 is a general block diagram of a data processing device that may incorporate a memory system according to an embodiment of the inventive concept.

FIG. 10 is a general block diagram of a data processing device that may incorporate a memory system according to an embodiment of the inventive concept.

Referring to FIG. 10, the data processing device comprises a memory system 1000, a host 2000, a display unit 3000, and input/output devices 4000.

The host 2000 may be a microprocessor of a computing system, for example. The host 2000 may use the memory system 1000 as a mass data storage device for data processing.

The display unit 3000 may have a liquid crystal having a backlight, a liquid crystal having an LED light source, or a touch screen (e.g., OLED). The display unit 3000 may be an output device for displaying images (e.g., characters, numbers, pictures, etc.) in color.

The input/output devices 4000 may include various input/output devices. In this case, a user interface may be installed at the input/output devices 4000. The user interface may be an input device including a number key, a function key, and so on, and may provide an interface between the data processing device and a user.

The memory system 1000 may have a system structure illustrated in FIG. 1. The memory system 1000 may operate in response to a control method like the one described with reference to FIG. 2. Thus, the memory system 1000 may respond to an access request of the host 2000 rapidly, so that the performance of the data processing device is bettered.

In FIG. 10, there is illustrated an example in which the memory system 1000 is connected with the host 2000 through a bus. However, the whole or a part of the memory system 1000 may be embedded in the host 2000.

The data processing device of FIG. 10 may be used as a mobile device or a smart card by adding or removing components to or from the data processing device.

In case of the mobile device, a separate interface may be connected with an external communications device. The communications device may be a DVD player, a computer, a set top box (STB), a game machine, a digital camcorder, or the like.

Although not shown in FIG. 10, the mobile device may further include an application chipset, a camera image processor (CIS), a mobile DRAM, and so on.

Chips of the memory system 1000 may be mounted independently or using various packages. For example, a chip may be packed by a package such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), Wafer-Level Processed Stack Package (WSP), or the like.

While the inventive concept has been described with reference to exemplary embodiments, it will be apparent to those skilled in the art that various changes and modifications may be made without departing from the scope of the present inventive concept as defined by the following claims. Therefore, it should be understood that the above embodiments are not limiting, but illustrative. For example, various changes and modifications on a recovery code managing method for recalling a recovery code after execution of a read operation according to a read request may be made without departing from the scope of the present inventive concept.

What is claimed is:

1. A method managing execution of recovery code defining a read recovery operation including a read retry operation for a memory system, the memory system including a Central Processing Unit (CPU), firmware configured to execute the recovery code, a storage device and a memory controller that controls the storage device, the method comprising:
   upon detecting a read error, the CPU causes the firmware to execute recovery code;
   during execution of the recovery code by the CPU and the firmware, generating a read request directed to a read retry operation, and immediately thereafter terminating execution of the recovery code by the CPU and the firmware;
   while the memory controller and the storage device operate to execute the read retry operation, the CPU performs another task unrelated to executing the recovery code:
   upon completion of the read retry operation, using the memory controller to generate an interrupt and providing the interrupt to the CPU; and
   in response to the interrupt, the CPU causes the firmware to again execute the recovery code.

2. The method of claim 1, wherein execution of the recovery code by the CPU and the firmware comprises:
   determining whether the read error is an uncorrectable read error; and
   upon determining that the read error is an uncorrectable read error, generating the read request directed to the read retry operation, else terminating execution of the recovery code.

3. The method of claim 2, wherein execution of the read retry operation comprises:
   using the memory controller to generate a read execute signal and providing the read execute signal to the storage device;
   performing the read retry operation in response to the read execute signal using the storage device; and
   upon completion of read retry operation, using the storage device to generate a read done signal and providing the read done signal to the memory controller.

4. The method of claim 1, wherein the read retry operation comprises defining a variable control voltage applied to the storage device during the read retry operation.

5. The method of claim 4, wherein the variable control voltage is a read voltage.

6. The method of claim 1, wherein the CPU causes the firmware to again execute the recovery code as part of an interrupt handling procedure.

7. The method of claim 1, further comprising:
   following completion of the read retry operation, updating management state information stored with the recovery code and defining at least in part the read recovery operation.

8. The method of claim 1, wherein the storage device is at least one NAND flash memory device and the memory controller is a NAND flash memory controller.

9. The method of claim 1, wherein the another task comprises a plurality of queued tasks waiting for the CPU to terminate execution of the recovery code.

10. A memory system comprising:
    a nonvolatile storage device and a memory controller that controls operation of the nonvolatile storage device;
    firmware stored at least in part in a volatile memory and including recovery code defining a read recovery operation, wherein the read recovery operation includes an iteratively executed read retry operation; and
    a Central Processing Unit (CPU) configured to operate in conjunction with the firmware to execute the recovery code in response to a read error,
    wherein during execution of the recovery code by the CPU and the firmware, the firmware generates a read request associated with the read retry operation, and the CPU is further configured to immediately terminate execution of the recovery code upon generation of the read request,
    while the memory controller and the storage device operate to execute the read retry operation, the CPU is further configured to perform another task unrelated to execution of the recovery code,
    wherein upon completion of the read retry operation, the memory controller is further configured to generate an interrupt and provide the interrupt to the CPU, and the CPU is further configured to again cause the firmware to execute the recovery code in response to the interrupt.

11. The memory system of claim 10, further comprising:
    an error correction capability (ECC) defining a range of correctable read errors and a range of uncorrectable read errors,
    wherein execution of the recovery code by the CPU and the firmware comprises determining whether the read error is an uncorrectable read error, and upon determining that the read error is an uncorrectable read error, generating the read request.

12. The memory system of claim 11, wherein upon determining that the read error is a correctable read error, the firmware further configured to terminate execution of the recovery code.

13. The memory system of claim 10, wherein the memory controller is further configured to generate a read execute signal and provide the read execute signal to the storage device in response to the read request; and
    the storage device is configured to perform the read retry operation in response to the read execute signal, and upon completion of the read retry operation, to generate a read done signal provided to the memory controller.

14. The memory system of claim 10, wherein the storage device is at least one NAND flash memory device and the memory controller is a NAND flash memory controller.

15. A method of managing execution of recovery code defining a read recovery operation including a read retry operation for a memory system, the memory system including a Central Processing Unit (CPU), firmware configured to execute the recovery code, a storage device and a memory controller that controls the storage device, the method comprising:
    upon detecting a read error, the CPU causes the firmware to execute the recovery code;
    during execution of the recovery code by the CPU and the firmware, generating a read request directed to a read retry operation, and immediately thereafter terminating execution of the recovery code by the CPU and the firmware; and thereafter, only upon receiving an asynchronous interrupt from the memory controller following completion of the read retry operation, the CPU resumes execution of the recovery code by the firmware, otherwise the CPU performs another task unrelated to execution of the recovery code.

16. The method of claim 15, wherein the storage device is at least one NAND flash memory device and the memory controller is a NAND flash memory controller.

17. The method of claim 16, wherein the at least one NAND flash memory comprises a three-dimensional memory cell array.

* * * * *